United States Patent [19]

Okube et al.

[11] Patent Number: 4,910,149
[45] Date of Patent: Mar. 20, 1990

[54] METHOD AND APPARATUS FOR DETECTING RADIATION

[75] Inventors: Jiro Okube; Tomoyoshi Moriya; Katsumi Yoshino, all of Osaka, Japan

[73] Assignee: Sumitomo Electric Industries, Ltd., Osaka, Japan

[21] Appl. No.: 759,501

[22] Filed: Jul. 26, 1985

Related U.S. Application Data

[63] Continuation-in-part of Ser. No. 707,296, Mar. 1, 1985, abandoned.

[30] Foreign Application Priority Data

Mar. 2, 1984 [JP] Japan ................................. 59-40920

[51] Int. Cl.[4] .............................................. G01T 1/04
[52] U.S. Cl. ................................. 436/57; 250/370.07; 436/58; 204/1 T
[58] Field of Search ................... 436/57, 58, 149, 151, 436/806, 902; 136/253; 250/370 F, 370.07; 204/1 T

[56] References Cited

U.S. PATENT DOCUMENTS

| | | | |
|---|---|---|---|
| 3,536,916 | 10/1970 | Boehm | 436/57 X |
| 3,865,550 | 2/1975 | Bott et al. | 436/151 |
| 4,003,707 | 2/1977 | Lübbers et al. | 422/83 X |
| 4,286,157 | 8/1981 | Eickel et al. | 250/370 F |
| 4,572,954 | 2/1986 | Josephson et al. | 250/370 F |

OTHER PUBLICATIONS

Yoshino, et al., Jpn. J. Appl. Phys., Part 2, 23(4), pp. 198–200.

Primary Examiner—Barry S. Richman
Assistant Examiner—Jill Johnston
Attorney, Agent, or Firm—Cushman, Darby & Cushman

[57] ABSTRACT

A method and apparatus for detecting the presence of radiation are provided by making use of the change that occur in the electrical and optical properties of an electroconductive polymer which is exposed to radiation while in contact with doping gas. Said method and apparatus can be applied to the purpose of detection or determination of all radiations including electron beams, gamma-rays, alpha-rays and neutron rays.

9 Claims, 8 Drawing Sheets

METHOD AND APPARATUS FOR DETECTING RADIATION

This is a continuation-in-part of application Ser. No. 707,296, filed Mar. 1, 1985, which was abandoned upon the filing hereof.

BACKGROUND OF THE INVENTION

1. Filed of the Art

The present invention relates to a method and apparatus for radiation detection that is suitable for use in measuring the level of radiation or monitoring the variation in radiation levels. 2. Description of the Prior Art The term "electroconductive polymers" as used hereafter includes polythiophene, polypyrrole, polyacetylene, polyparaphenylene, polyparaphenylene sulfide, polyaniline, polyphenylylacetylene, polyphenylenevinylene, and derivatives thereof. These are just a few examples of the electroconductive polymers that can be used in the present invention, and they include any of the highly conjugated polymers, such as those described in "Gosei Kinzoku (Synthetic Metals)", by Shirakawa and Yamabe, Kagaku Dojin. All of the polymers shown in this monograph are insulators in their normal state.

High-molecular weight compounds are in most cases insulators.

Several high-molecular weight compounds are known to be electroconductive. These compounds remain insulators until they are doped with certain gases. Doping gases that are known to be capable of causing an appreciable increase in the conductivities of polymers that are exposed to such gases include $I_2$, $Br_2$, $AsF_5$, $SO_3$, $BF_4$, etc.

Doping with these gases may be simply carried out by placing a thin film of the polymer of interest within the gases; if necessary, an electric field may be created by the polymer film and the other electrode placed within a liquid electrolyte. Several proposals have been made for rendering polymers conductive by treatment with doping gases. However, the idea of rendering polymers conductive by treatment with the combination of radiation and doping gases is the creation of the present inventors on their own.

SUMMARY OF THE INVENTION

The principal purpose of the present invention is to provide a method and apparatus for detecting the presence of radiation by making use of the changes that occur in the electrical and optical properties of an electroconductive polymer which is exposed to radiation while in contact with doping gas.

The present invention also provides a detection method or apparatus of this type which depends for its operation on the change in electrical resistance. Also provided is a detection method or apparatus depending for its operation on the change in absorption characteristics. In one embodiment, the apparatus consists of a single unit which, when irradiated, produces a corresponding absorption spectrum or a change in the spectral peak, and such data are used to determine the absorbed dose of the radiation. The apparatus in accordance with the present invention may also be fabricated by combining fiber optics with light emitting and receiving devices.

Other objects and advantages of the present invention may become apparent to those skilled in the art from the following description and disclosure.

DESCRIPTION OF THE PREFERRED EMBODIMENT

The electrical resistances of polymeric material such as polythiophene that were formerly believed to be insulators were reduced when exposed to electron beams in the presence of gases such as $SF_6$, Freon and $CBr_4$. This phenomenon was first discovered by the present inventors. The Freon gases just mentioned include Freon 11, Freon 12, Freon 22, Freon 502, Freon 113 and Freon 114. To the knowledge of the present inventors, the changes in the electrical and optical properties of polymers that result from treatment by the combination of doping gases and irradiation can rightly be called an entirely new phenomenon.

Sulfur hexafluoride ($SF_6$) and the other compounds listed above as doping gases are known substances, but even if polymers are simply doped with these substances, their conductivities are not appreciably increased. In other words, the substances mentioned above are not effective doping gases if they are used alone. According to the finding of the present inventors, these substances prove effective as doping gases only when they are used in combination with irradiation.

Thus, the present invention relates to a method and an apparatus for measuring the dose of radiation or detecting the presence of radiation by making use of the new finding that when doping gases that are by themselves unable to cause significant changes in the electrical conductivities and absorption spectra of conductive polymers are exposed to radiation, such gases acquire the ability to significantly increase the conductivities of the polymers and cause considerable changes in their absorption spectra.

The doping gases that can be used in the present invention include $SF_6$, Freon, $CBr_4$ and any other gases that become effective as doping gases or which are decomposed to produce effective doping gases when they are exposed to radiation. The conductive polymers that can be used in the present invention include polyacetylene, polythiophene and any other polymers that are highly conjugated and have electrical conductivities of about $10^{-14}$ S/cm or higher.

The present invention is hereunder described by taking as one example the combination of polythiophene and $SF_6$. First, polythiophene is taken as an exemplary conductive polymer and its electrical and optical properties are described, but it should be understood that the scope of the present invention is by no means limited to polythiophene.

FIG. 13 shows the molecular structure of thiophene, which is polymerized to produce polythiophene. Polythiophene is sometimes referred to as polythienylene. A very thin film, on the order of several thousand angstroms in thickness, of polythiophene was fabricated as a specimen for the measurement of absorption coefficient, whereas a much thicker film was prepared for use in the measurement of electrical resistance.

Figure 8:
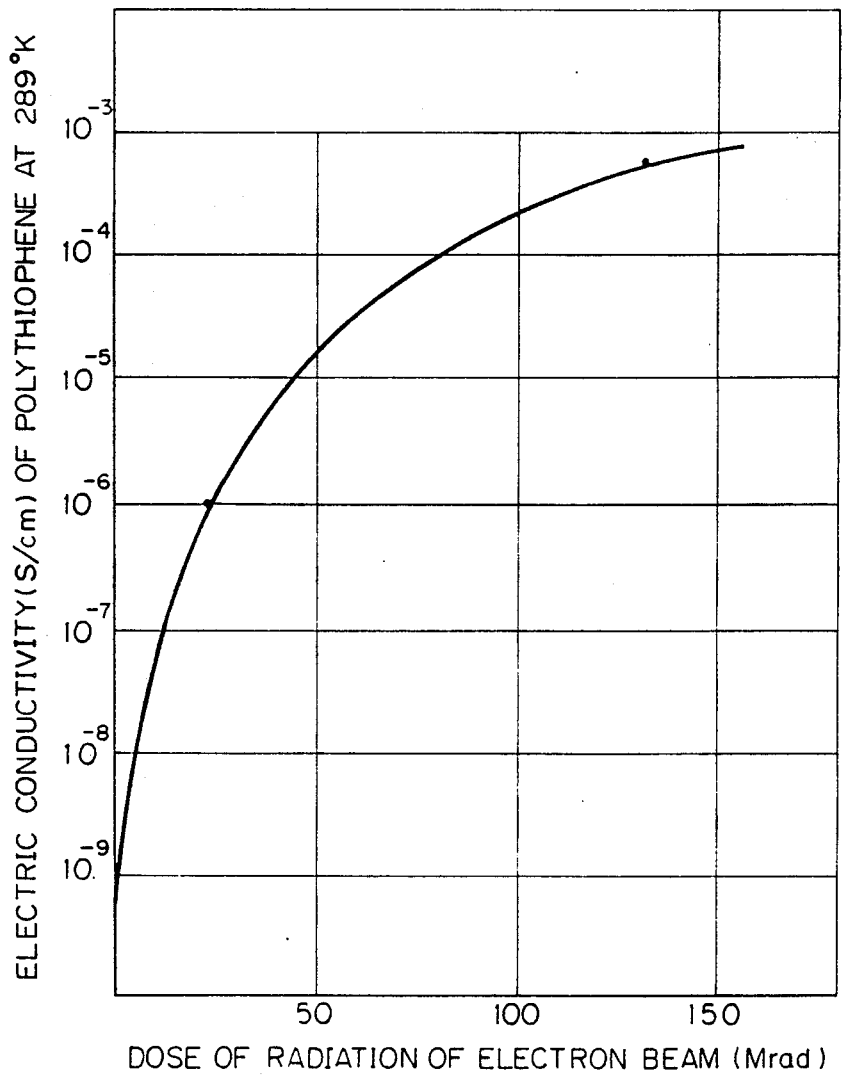
FIG. 8 is a graph showing the profile of the electrical conductance of polythiophene which was exposed at 289° K to an electron beam having an acceleration energy of 1.8 MeV, wherein the x-axis represents the dose of radiation (Mrad) and the y-axis the conductivity (S/cm)

FIG. 8 is a graph showing the profile of conductivity of polythiophene that was exposed to an electron beam in the presence of $SF_6$, wherein the x-axis represents the exposed dose of electron beams (Mrad) and the y-axis, the conductivity of polythiophene (S/cm). The data shown in FIG. 8 were obtained by the present inventors, with the pressure of $SF_6$ held at one atmosphere and the temperature at 289° K. The symbol S stands for the siemens which is the reciprocal of the ohm. The symbol rad is a measure for absorbed dose, and one rad means that an energy of 100 ergs was absorbed by an object having a mass of one gram. The x-axis of the graph in FIG. 8 is scaled on Mrads, and one Mrad is equal to $10^6$ rads. An absorbed dose of 1 Mrad means that an energy of 10 joules was absorbed by an object having a mass of one gram.

As FIG. 8 shows, the thiophene had a conductance of less than $10^{-9}$ S/cm in the absence of exposure to electron beams. When the polythiophene sample was subjected to an electron beam having an acceleration voltage of 1.8 MeV, the conductivity of the sample increased with the dose of irradiation. At an absorbed dose of 24 Mrad, the conductance was $10^{-6}$ S/cm, and at 132 Mrad, the conductivity was about $10^{-3}$ S/cm, which was about $10^6$ times as high as the value obtained in the absence of exposure to electron beams.

As the temperature increases, the conductivity of the polythiophene also increases, showing a tendency similar to that of semiconductors. The present inventors therefore calculated the activation energy (Ea) of the thiophene, assuming the formula $\exp(-Ea/kT)$ where T is the absolute temperature. The activation energy is a function of the absorbed dose; at 132 Mrad, the activation energy was 0.08 eV, and at 24 Mrad, Ea was 0.16 eV. In the absence of exposure to electron beams, Ea=0.41 eV.

Figure 9:
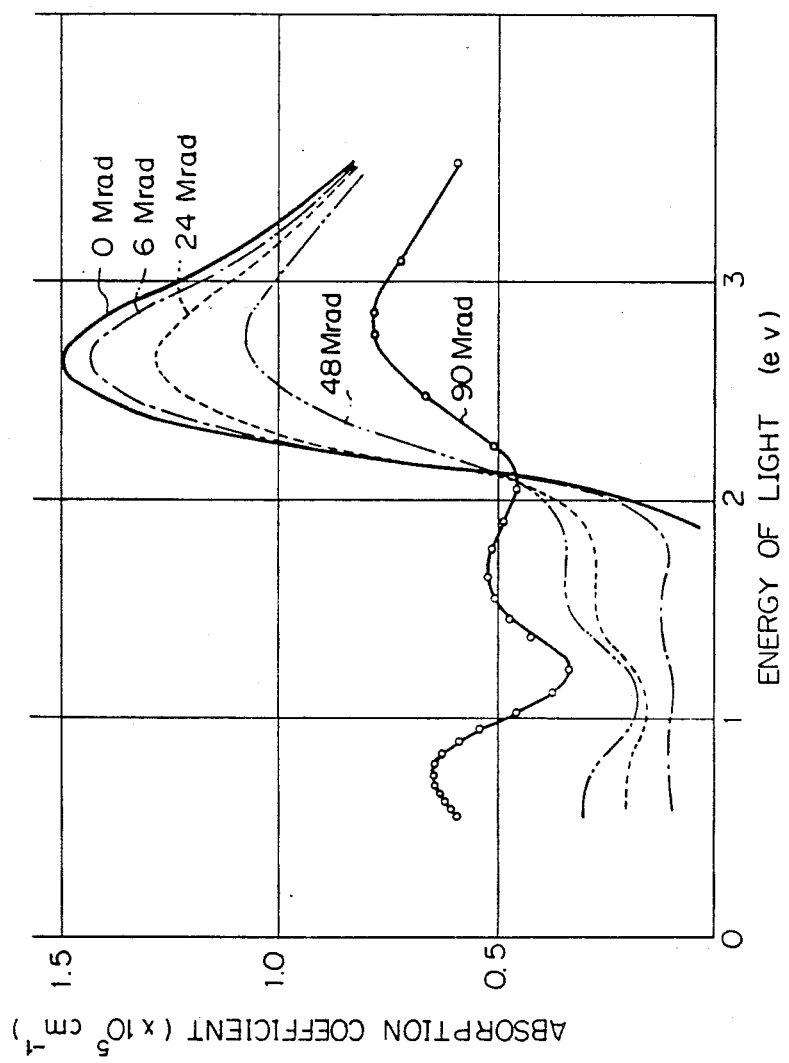
FIG. 9 is a graph showing the absorption spectra of a polythiophene film, with the dose of radiation of an electron beam taken as a parameter, wherein the x-axis represents the energy of light (eV) and the y-axis the absorption coefficient ($cm^{-1}$)

The present inventors then measured the absorption coefficient of polythiophene that was placed in an atmosphere filled with $SF_6$ gas, with the absorbed dose of electron beams taken as a parameter that was selected at 0, 6, 24, 48 and 90 Mrad. Since the absorption coefficient of the polythiophene is on the order of $10^5$/cm, very thin films of thiophene (on the order of several thousand angstroms in thickness) were used. The data obtained are shown graphically in FIG. 9, wherein the energy of light ($hc/\lambda$) is expressed in electron volts on the x-axis. The energy of light has the following relation with the wavelength ($\lambda$):

$$\lambda = \frac{1.28}{(eV)} \, (\mu m) \quad (1)$$

In the absence of exposure to electron beams, the thiophene had an absorption peak at 2.6 eV, or 0.47 $\mu$m in terms of the wavelength. This corresponds to an absorption coefficient of $1.5 \times 10^5$/cm. The peak for 2.6 eV shifted downwardly when the sample was exposed to an electron beam. As the dose of irradiation was increased, additional low peaks appeared in the infrared region. At 90 Mrad, two additional peaks occurred, one at 1.7 eV (0.72 $\mu$m) and the other at 0.8 eV (1.5 $\mu$m). Both peaks were within the infrared region and had values of absorption coefficient that were close to the value for the peak at 2.6 eV. For the sake of convenience, let the peak for 2.6 eV be referred to as peak (1), and that for 1.7 eV as peak (2).

Figure 10:
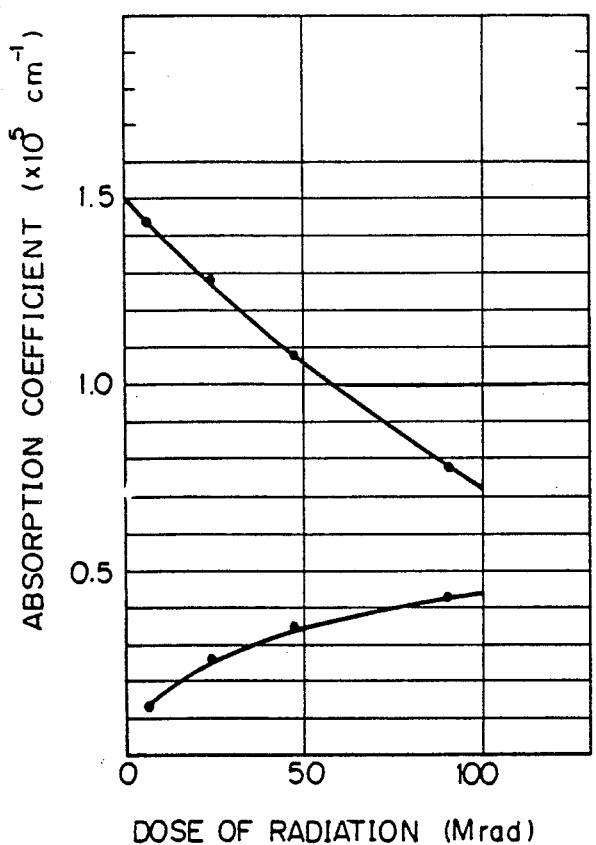
FIG. 10 is a graph showing how the intensity of peak (1) for 2.6 eV and peak (2) for 1.7 eV in the absorption spectra of a polythiophene film varies with the dose of radiation of an electron beam, wherein the x-axis represents the dose of radiation (Mrad) and the y-axis the absorption coefficient ($cm^{-1}$)
Figure 12:
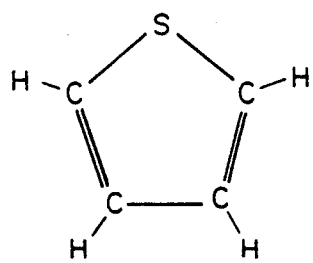
FIG. 12 shows the chemical structure of thiophene.

The profile or peaks (1) and (2) as related to the absorbed dose of electron beams is shown in FIG. 10. Peak (1) decreased almost linearly with the increase in the absorbed dose of electron beams. This means the absorption of light having a wavelength of 0.47 $\mu$m decreased as the dose of electron beams was increased. Conversely, peak (2) increased almost linearly with the increasing dose of electron beams, suggesting that the absorption of light having a wavelength of 0.72 $\mu$m increased as the dose of electron beams was increased.

Figure 11:
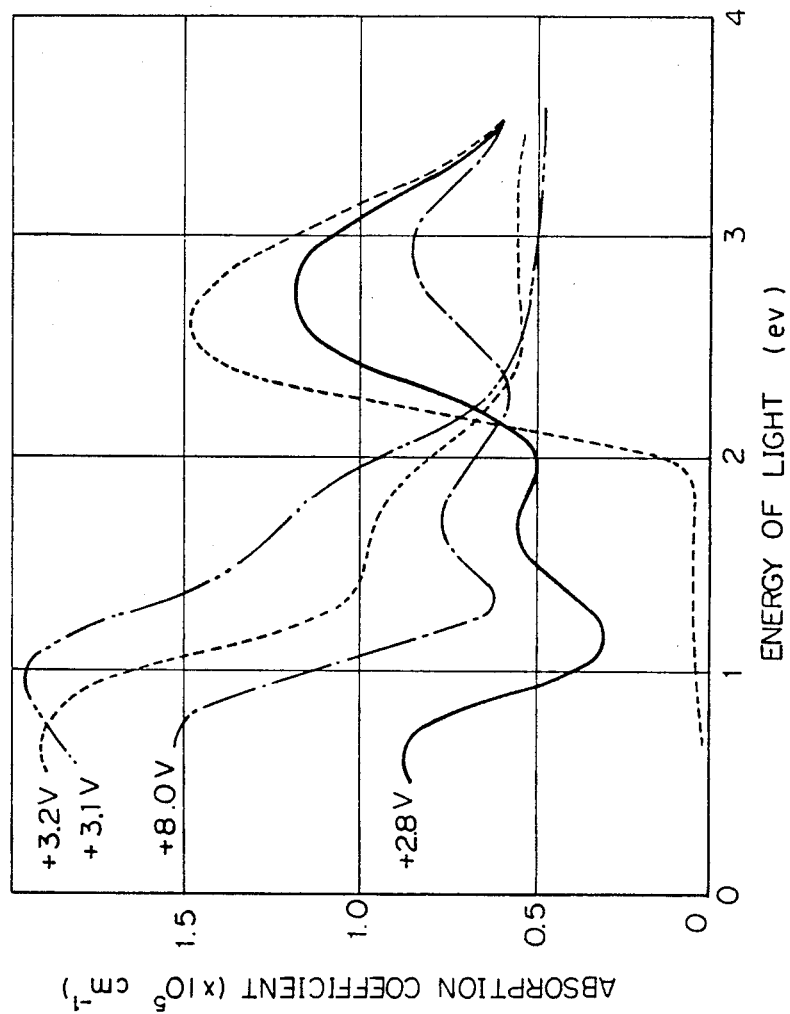
FIG. 11 is a graph showing the absorption spectra of polythiophene doped with $BF_4$ in an electric field, with the bias voltage taken as a parameter.

This profile of changes in the absorption coefficient bears a close resemblance to the results that the present inventors obtained by electrochemical doping of polythiophene with $BF_4$. The data shown in FIG. 11 were obtained by doping the polythiophene with $BF_4$ in $LiBF_4$ that was dissolved in benzonitrile with a positive voltage applied to the polythiophene with respect to a counter electrode. The graph in FIG. 11 shows the profile of absorption spectra with the bias voltage (Va) taken as a parameter. The x-axis represents the light energy in electron volts and the y-axis, the absorption coefficient ($\times 10^5$/cm). When no bias voltage was applied, an absorption peak occurred at 2.6 eV, which corresponded to the interband transition of polythiophene. The curve for Va=0 seems almost identical to the curve in FIG. 11 obtained by doping polythiophene with $SF_6$ in the absence of exposure to electron beams. This may indicate that no doping of the polythiophene with $BF_4$ occurred in the absence of a bias voltage. Similarly, no effective doping of polythiophene with SF$_6$ seems to have occurred in the absence of exposure to electron beams.

As the bias voltage (Va) in BF$_4$ was increased, the absorption peak at 2.6 eV shifted downwardly and two additional peaks began to appear, one in the vicinity of 1.7 eV and the other between 0.6 and 0.8 eV. As the bias voltage increased further, the peak in the infrared region of 0.6–0.8 eV became higher until it exceeded the peak for 2.6 eV when the bias voltage (Va) was in the neighborhood of +2.8 V. The curve for Va=2.8 V is very similar to the curve in FIG. 9 obtained by exposing SF$_6$ to an electron beam having a total dose of 90 Mrad. It is therefore assumed that exposing polythiophene to electron beams in an SF$_6$ atmosphere produces substantially the same effect as obtained by doping the polythiophene with BF$_4$ placed in an electric field having a positive bias voltage of Va. This phenomenon could be explained by one of the following three mechanisms.

(1) A charge transfer complex is formed between SF$_6$ and the polymer chain ($\pi$ conjugation) of polythiophene as a result of exposure to an electron beam.

(2) Components of decomposed SF$_6$ are doped into the polythiophene.

(3) Chains in the polythiophene are crosslinked without destroying the conjugated double bonds.

The weight of the polythiophene was increased when it was subjected to an electron beam in the SF$_6$ atmosphere, and this suggests the validity of the first two mechanisms. As already pointed out, the profile of the absorption coefficient of polythiophene that was irradiated with an electron beam in the SF$_6$ atmosphere was the same as the result obtained by doping the polythiophene with BF$_4$ is an electric field having a positive bias voltage. It can therefore be asserted that SF$_6$ irradiated with an electron beam enabled effective doping of the polythiophene with all or part of the molecule of SF$_6$. Therefore, of the three mechanisms presented above, (1) seems most probable. It is however impossible to know whether the polythiophene is doped with SF$_6$ in its entirety or with a component of the decomposed SF$_6$.

While the foregoing explanation concerns the polythiophene used as an electroconductive polymer, the present inventors confirmed that all of the conductive polymers listed in the introductory part of this specification experienced similar changes in their electrical and optical properties when they were subjected to SF$_6$, Freon, CBr$_4$ and other doping gases under exposure to radiation.

Radiation Detector Depending on Change in Resistance

Figure 1:
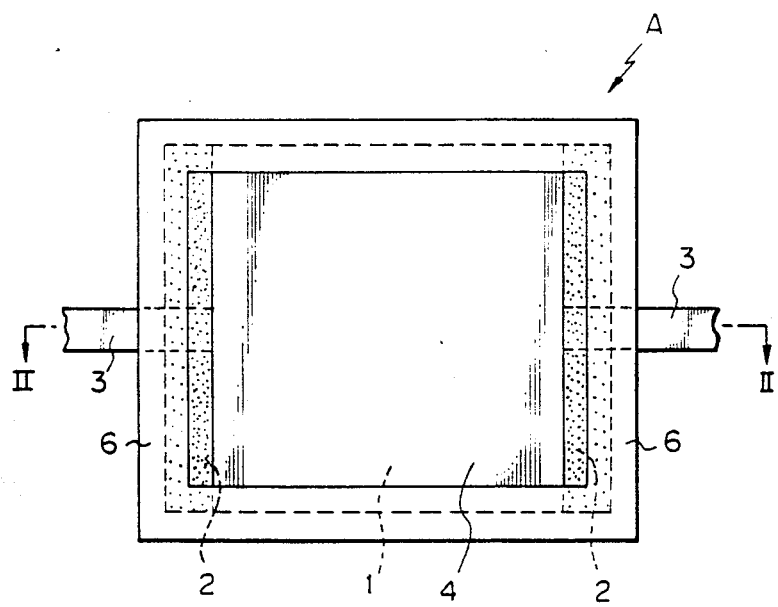
FIG. 1 is a plan view of the radiation detector according to one embodiment of the present invention that depends for its operation on the change in electrical resistance.
Figure 2:
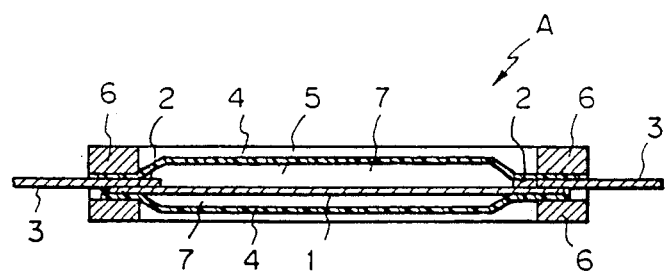
FIG. 2 is a cross section taken on line II—II of FIG. 1.

FIG. 1 is a plan view of an embodiment of the radiation detector depending for its operation on the change in resistance, and FIG. 2 is a cross section taken on line II—II of FIG. 1.

A thin rectangular film of electroconductive polymer 1 has a pair of electrodes 2, 2 on both sides which is formed by vapor deposition or printing techniques. A metal lead plate 3 is bonded to each electrode 2. The electronconductive film 1 is sandwiched between two outer films 4 which are heat-sealed on the four peripheral sides to confine the polymer film 1 within an inner space 5 which has been filled with a doping gas 7. The outer film 4 may be made of polyethylene. The resulting assembly may be immediately used as a complete device, but if greater convenience of handling is needed, the four sides of the outer coat 4 may be reinforced with a pair of frames 6, 6. The presence of radiation can be detected by simply measuring the electrical resistance between the lead plates 3, 3.

Measuring the electrical resistance across this simple device is sufficient for the purpose of detecting the presence or absence of radiation. The user is able to ascertain the presence of a predetermined dose of radiation if the resistance R across the device is lower than a threshold level Rc.

If one wants to know the absolute value of the dose of radiation, it is necessary to use various corrective circuits. As described above, the resistance of an electroconductive polymer is a function of both temperature and the dose of radiation. If the change in temperature is not excessively great, a corrective circuit is not particularly necessary since the conductance of the polymer varies with the dose of radiation by several factors. However, if a particularly precise measurement is necessary, a thermometer may be placed in the neighborhood of the device and the dose of radiation can be determined from the measured temperature of the device and the resistance across it. The thermometer may be comprised of a thermistor or thermocouple.

The energy of radiation is another factor that affects the relationship between the dose of radiation and the change in electrical resistance. If the dose of radiation is small, longer electrodes may be positioned at smaller spacings.

Figure 3:
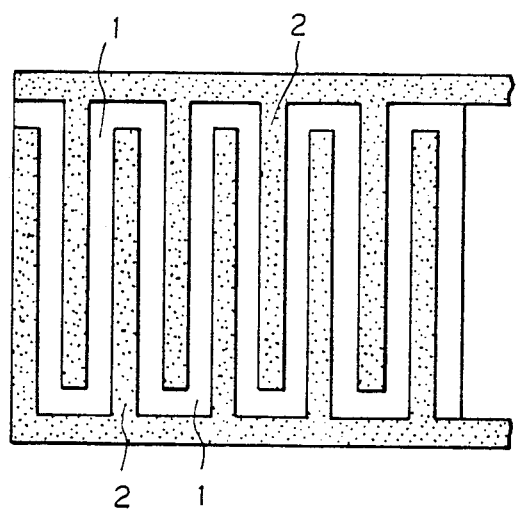
FIG. 3 is a plan view of the detector which is a modification of FIG. 1 and uses interdigital electrodes on an electroconductive polymer film.

FIG. 3 is a plan view of an electroconductive film 1 having interdigital electrodes 2, 2. This arrangement is characterized by a lower resistance between the electrodes and ensures a precise measurement of the change in resistance that results from a low dose of radiation.

Figure 4:
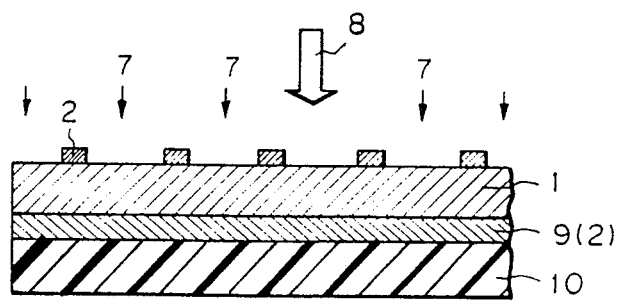
FIG. 4 is a cross section of the detector which is another modification of FIG. 1 and uses a transversal electrode array.

It is not necessary that both sides of the polymer film 1 be in contact with the doping gas 7; it is sufficient for only one side of the film to be in contact with the doping gas, as shown in FIG. 4. The electroconductive polymer film 1 in FIG. 4 has an In$_2$O$_3$ film 9 and a reinforcing film 10 adhered to the back side. In this arrangement, the In$_2$O$_3$ film 9 is used as one electrode. The other electrode 2 may be comprised of spaced stripes that are formed on top of the polymer film 1 by vapor deposition or printing techniques. This electrode structure has a higher sensitivity and ensures an accurate measurement of a low dose of radiation.

Radiation Detector Depending on Change in Absorption

The radiation detector shown above that operates on the phenomenon of change in resistivity has the advantage of simple construction and high sensitivity, but because of the high impedance of the sensor portion, this type of detector sometimes produces noise problems. This defect can be eliminated by providing an amplifier circuit in close proximity to the sensor portion, but then an electric wire leading to the point of measurement becomes necessary. The point where radiation is to be detected is in many cases far distant from the control and monitoring center and must be connected to the latter by a long cable. These problems can be effectively coped with by using an optical fiber. The use of fiber optics is particularly suited to the purposes of the present invention which makes use of the change in the absorption coefficient of electroconductive polymers. Taking polythiophene as an example, the only factor that must be measured is the absorption coefficient of the peak at 2.6 eV or 1.7 eV.

Figure 5:
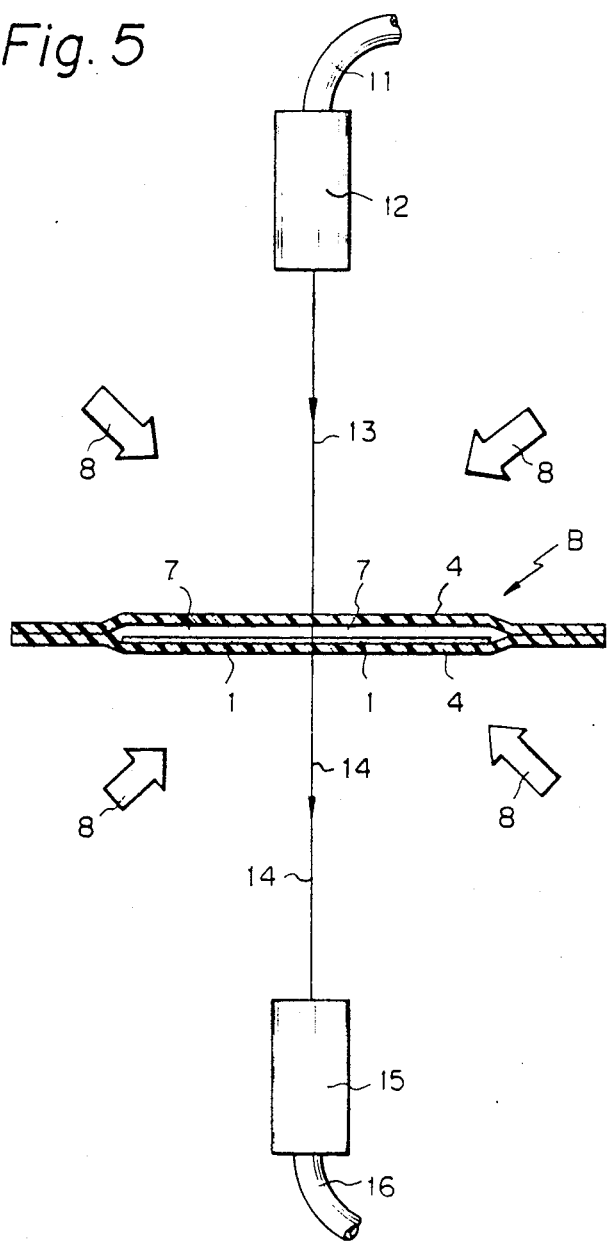
FIG. 5 is a diagram of the sensor portion in the radiation detector in accordance with another embodiment of the present invention which depends for its operation on the change in absorption coefficient.

FIG. 5 is a sketch of a detector device using fiber optics. The electroconductive polymer film 1 in this embodiment has no electrode and is simply confined within the space between outer films 4, 4 together with a doping gas 7. Light issuing from a light-emitting device (not shown) passes through an optical fiber 11, emerges from a sleeve 12, enters the sensor device B in the normal direction, and passes through the polymer film 1. The light then enters a receiving sleeve 15 and propagates through a return optical fiber 16.

Figure 6:
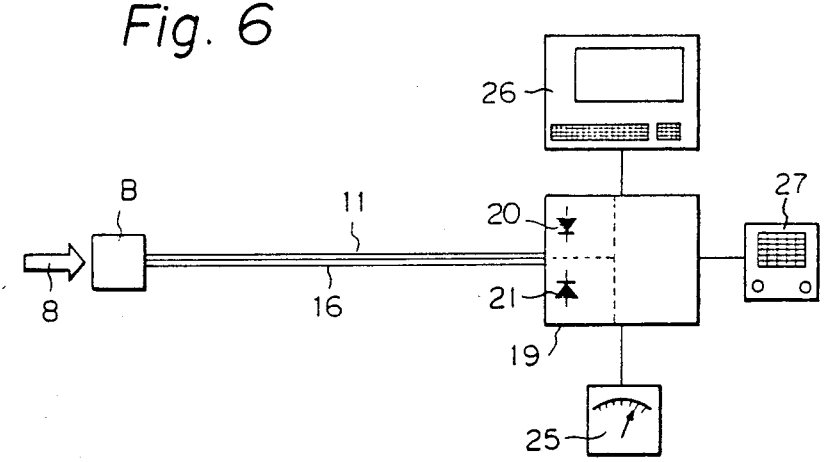
FIG. 6 is the general view of the radiation detector system incorporating the device shown in FIG. 5.

FIG. 6 shows the general view of the radiation detector system incorporating the device B. A control panel or processing unit generally indicated at 19 includes a light-emitting device 20, a light-receiving device 21, a drive circuit for the device 20 and an amplifier circuit for amplifying the signal received at the device 21. The intensity of the light 13 incident upon the polymer film 1 relative to that of the transmitted light 14 is measured and combined with the measured value of temperature T for loading into a microcomputer 26 which calculates the dose of radiation and, if necessary, stores the result. The calculated dose of radiation may be read on a meter 25, which may be so designed as to simply indicate the ratio of the intensity of the incident light to that of the transmitted light. Continuous data recording may be made on a recorder 27.

Figure 7:
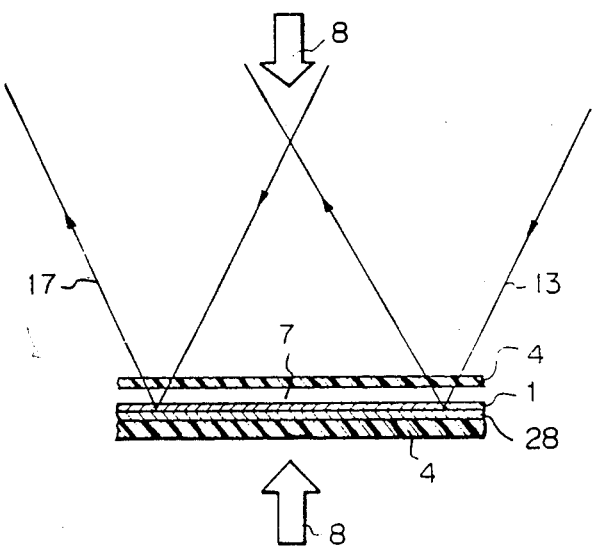
FIG. 7 is a partial cross section of a modification to FIG. 5, wherein light is caused to enter the device at an angle and to be reflected for the measurement of its intensity.

FIG. 7 shows the operating principle of a reflecting radiation detector, which comprises an electroconductive polymer film 1 having a reflector layer 28 formed on the back side by vacuum evaporation of a metal. Light indicated at 13 falls on the device from above at an angle, passes through the polymer film 1, is reflected at the layer 28, passes again though the polymer film 1, and departs from the device as shown in FIG. 7. The device shown in FIG. 5, 6 or 7 is so arranged that the polymer film 1 is exposed to radiation 8 that is incident on either the front or back side of the film. In the embodiments shown, the detector device B is used in combination with optical fibers, as well as light-emitting and -receiving devices. If one wants to use the detector device B independently, it can be set in an area of interest, and after exposure to radiation, the detector is removed and absorption spectroscopy performed. Alternatively, the dose of radiation may be determined on the basis of the change in the absorption coefficient for peak (1) or (2).

Other Embodiments

The foregoing embodiments relate to the use of polythiophene as an electroconductive polymer, but it should be understood that the concept of the present invention can also be realized by using the following conductive polymers.

1. Polyselenophene film (12 μm thick)
Doping gas: $SF_6$ (1 atm.)

| Dose of electron beam (Mrad) | Conductance (S/cm) |
| --- | --- |
| 0 | $10^{-9}$ |
| 30 | $10^{-6}$ |
| 90 | $10^{-4}$ |

2. Polyparaphenylene pellets made by powder compaction Doping gas: $SF_6$ (1 atm.)

| Dose of electron beam (Mrad) | Conductance (S/cm) |
| --- | --- |
| 0 | $10^{-8}$ |
| 12 | $10^{-7}$ |
| 36 | $10^{-4}$ |
| 90 | $10^{-2}$ |

3. Polymethylthiophene
Doping gas: $SF_6$ (1 atm.)

| Dose of electron beam (Mrad) | Conductance (S/cm) |
| --- | --- |
| 0 | $10^{-11}$ |
| 30 | $10^{-6}$ |
| 48 | $10^{-4}$ |
| 90 | $10^{-2}$ |

4. Polymethylthiophene
Doping gas: Freon (1 atm.)

| Dose of electron beam (Mrad) | Conductance (S/cm) |
| --- | --- |
| 0 | $10^{-11}$ |
| 36 | $10^{-8}$ |
| 60 | $10^{-5}$ |

Advantages of the Invention (1) The present invention enables the user to measure the dose of radiation or check for leakage radiation by a fairly simple mechanism.

(2) The concept of the present invention is particularly effective in the dosimetry of high levels of electron beams.

(3) The detector device in accordance with the present invention that depends for its operation on the change in electrical resistance permits a great freedom for choosing high sensitivity and can be fabricated with great ease because of the small thickness of the electroconductive polymer film used.

(4) The detector of the type that depends for its operation on the change in absorption coefficient can be separated into a sensor portion and a processing unit. The two components can be connected by optical fibers which are immune to electromagnetic interference. The optical fibers permit signal transfer over a long distance and, additionally, optical cables can be laid more easily than conventional coaxial cables because of their light-weightness and ruggedness.

(5) The detector of the type that depends on the change in absorption coefficient may be designed as a separate, easy-to-handle device in a thin sheet form. After exposure to radiation, the device is detached from the point of exposure for the purpose of determining the dose of radiation by absorption spectroscopy or by measurement of the change in the absorption coefficient for peak (1) or (2). The device is compact and simple to use.

(6) As is obvious from the theory of, its operation the present invention can be applied to the purpose of detection or determination of all radiations including electron beams, gamma-rays, alpha-rays and neutron rays.

What is claimed is:

1. A method for detecting electron beams, gamma-rays, alpha-rays and neutron ray radiation, comprising the steps of:

placing an electroconductive polymer that is highly conjugated and has an electrical conductivity of at least about $1-{}^{-14}$ S/cm into a space formed by a pair of outer films exposing the polymer to said radiation in an atmosphere of a doping gas; and determining the amount of any radiation received by such polymer by measuring the electrical resistance or light absorbing characteristics of said electroconductive polymer, said doping gas being selected from the group consisting of sulfur hexafluroide, Freon 11, Freon 22, Freon 502, Freon 113, Freon 114 and carbon tetrabromide.

2. An apparatus for detecting electron beams, gamma-rays, alpha-rays and neutron ray radiation, which comprises:

an electroconductive polymer film that is highly conjugated and has electrical conductivities of at least about $10^{-14}$ S/cm in an atmosphere of a doping gas confined within a space formed by a pair of outer films that are joined on peripheral sides thereof, said doping gas being selected from the group consisting of sulfur hexfluoride, Freon 11, Freon 22, Freon 502, Freon 113, Freon 114 and carbon tetrabromide and said outer films being impermeable membranes.

3. An apparatus according to claim 2 wherein said electroconductive polymer film is made of polythiophene.

4. An apparatus according to claim 2 wherein said electroconductive polymer film is made of polyacetylene.

5. An apparatus according to claim 2 wherein said doping gas is sulfur hexafluoride ($SF_6$).

6. A detector system for radiation selected from the group consisting of electron beams, gamma-rays, alpha-rays and neutron rays, comprising:

a device including an electroconductive polymer film that is highly conjugated and has electrical conductivities of at least about $10^{-14}$ S/cm and a pair of electrodes; and a mechanism for measuring the electrical resistance between said electrodes and a doping gas, said electroconductive polymer, said mechanism and said doping gas being confined within the space formed by a pair of outer films and being heat-sealed on the peripheral sides thereof, said doping gas being selected from the group consisting of sulfur hexafluoride, Freon 11, Freon 22, Freon 502, Freon 113, Freon 114 and carbon tetrabromide, and said outer films being impermeable membranes.

7. A detector system for radiation selected from the group consisting of electron beams, gamma-rays, alpha-rays and neutron rays, comprising:

a sensing device which comprises an electroconductive polymer film that is highly conjugated and has electrical conductivities of at least about $10^{-14}$ S/cm confined, together with doping gas, within the space formed by a pair of outer films, a processing unit including a light-emitting device, a light-receiving device, a drive circuit for the light-emitting device and a circuit for amplifying a signal received at the light-receiving device, an optical fiber that guides the emitted light to enter the electroconductive polymer film, and an optical fiber that causes the light that has been transmitted through the polymer film to be returned to the light-receiving device, said doping gas being selected from the group consisting of sulfur hexafluoride, Freon 11, Freon 22, Freon 502, Freon 113, Freon 114 and carbon tetrabromide, and said outer films being impermeable membranes.

8. An apparatus for detecting electron beams, gamma rays, alpha rays and neutron ray radiation comprising:

an electroconductive polymer film that is highly conjugated and has electrical conductivities of at least about $10^{-14}$ S/cm;

a pair of electrodes attached to said electroconductive polymer film;

a pair of outer films that are sealed to each other on peripheral sides thereof forming an interior space in which said electroconductive film is disposed; and a doping gas in said interior space selected from the group consisting of sulfur hexafluoride, Freon 11, Freon 22, Freon 502, Freon 113, Freon 114 and carbon tetrabromide.

9. A system for detecting electron beams, gamma rays, and neutron ray radiation comprising:

an electroconductive polymer film that is highly conjugated and has electrical conductivities of at least about $10^{-14}$ S/cm a pair of outer films that are sealed to each other on peripheral sides thereof forming an interior space in which said electroconductive film is disposed;

a doping gas in said interior space selected from the group consisting of sulfur hexafluoride, Freon 11, Freon 22, Freon 502, Freon 113, Freon 114 and carbon tetrabromide;

a pair of electrodes on said electroconductive polymer film; and means for measuring the electrical resistance between said electrodes, the amount of radiation being measured by the change in resistance of said electroconductive film.

* * * * *